United States Patent Office 3,652,564
Patented Mar. 28, 1972

3,652,564
5-ALKYL-1,6-FUSED CYCLOALKYLENE-TETRA-HYDRO-1,5-DIAZINE SALTS
David J. Ellis, Mountain View, and David Rammler, Palo Alto, Calif., assignors to Syntex Corporation, Panama, Panama
No Drawing. Filed Dec. 1, 1969, Ser. No. 881,299
Int. Cl. C07d 51/46
U.S. Cl. 260—251 A                                                17 Claims

ABSTRACT OF THE DISCLOSURE

Quaternary ammonium salts of the formula:

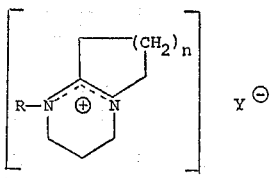

wherein R is a straight or branched alkyl group having between 10 to 24 carbon atoms in the straight chain, $n$ is a positive integer of from 1 to 3; Y is an acceptable ion; and the broken line (— — —) indicates that the carbon-nitrogen double bond resonates between the two nitrogen atoms and the positive charge is distributed between the two nitrogens;
and methods of preparing such methods by the reaction of a diazabicycloalkene with a substituted alkane. The compounds have utility as anti-bacterial agents.

---

This invention relates to novel alkyl substituted quaternary ammonium salts which have anti-bacterial activity.

In another aspect, the invention relates to alkyl substituted quaternary ammonium salts having the following general formula:

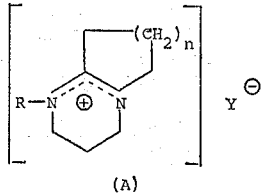

(A)

in which R is a straight or branched alkyl group having between 10 to 24 carbon atoms in the straight chain, $n$ is a positive integer of from 1 to 3, and Y is an acceptable anion. The broken line (— — —) indicates that the carbon-nitrogen double bond resonates between the two nitrogen atoms and the positive charge is distributed between the two nitrogens.

The preferred alkyl group is a straight chain alkyl of ten to 24 carbon atoms. Such alkyls include, for example, n-decyl, n-hexadecyl, n-octadecyl, n-tetracosyl, and the like. Equally suitable, though less preferred for economic reasons, are the branched alkyls having a backbone of from 10 to 24 carbon atoms. The branched groups may be lower alkyls containing from one to 8 carbon atoms or more, such as methyl, ethyl, n-propyl, isopropyl, n-butyl, sec-butyl, t-butyl, n-pentyl, n-heptyl, n-octyl and the like. Also suitable are cycloalkyl groups such as cyclopropyl, cyclobutyl, cyclohexyl, and the like. One or more of these alkyl, or cycloalkyl groups, or mixtures thereof may be attached at any site or combination of sites along the $C_{10}$–$C_{24}$ backbone.

By the term "acceptable anion" is meant an anion which does not inhibit the anti-bacterial activity of the quaternary ammonium salt. Where the product of this invention is to be used in treating animals, etc., the anion is preferably a pharmaceutically acceptable anion.

The expression "pharmaceutically acceptable anion," as used herein, refers to a pharmaceutically acceptable anion of an inorganic or organic acid conventionally used in the pharmaceutical art derived from acids, such as, for example, sulfuric, hydrochloric, hydrobromic, hydroiodic, phosphoric, lactic, benzoic, acetic, propionic, maleic, malic, tartaric, citric, cyclohexylsulfamic, succinic, nicotinic, ascorbic acids, and the like. Preferred pharmaeutically acceptable anions are bromide, and chloride. Additionally, preferred anions are sulfate, acetate, and lactate.

Where formulations containing the quaternary ammonium salt are to be used for disinfecting inanimate objects, the anion need not be limited to a pharmaceutically acceptable anion. However, for reasons of safety, the anion should preferably be non-toxic.

Typical compounds of the present invention include
5-decyl-1,5-diazabicyclo[5.4.0]undecenonium chloride,
5-decyl-1,5-diazabicyclo[5.4.0]undecenonium methyl sulfonate,
5-tetradecyl-1,5-diazabicyclo[4.4.0]decenonium iodide,
5-octadecyl-1,5-diazabicyclo[4.3.0]nonenonium bromide,
5-hexadecyl-1,5-diazabicyclo[4.4.0]decenonium sulfate,
5-(10'-methylundecyl)-1,5-diazabicyclo[4.4.0] decenonium bromide,
5-(5'-methyldecyl)-1,5-diazabicyclo[4.4.0]decenonium acetate,
5-(16'-methyloctadecyl)-1,5-diazabicyclo[4.4.0] decenonium citrate,
5-(7',8'-dimethyltetradecyl)-1,5-diazabicyclo[4.4.0] decenonium maleate,
5-(2'-hexyldecyl)-1,5-diazabicyclo₁4.3.0]nonenonium chloride,
5-(2',4',6'-triethyldecyl)-1,5-diazabicyclo[4.3.0] nonenonium lactate,
5-tricosyl-1,5-diazabicyclo[4.3.0]nonenonium chloride,
5-eicosyl-1,5-diazabicyclo[5.4.0]undecenonium chloride,
5-(3',7',11',15'-tetramethylhexadecyl)-1,5-diazabicyclo [5.4.0]undecenonium bromide,
5-(10'-cyclohexadecyl)-1,5-diazabicyclo[5.4.0] undecenonium bromide,
5-(2'-hexyl-10'-cyclopropyldecyl)-1,5-diazabicyclo [5.4.0]undecenonium chloride, and the like.

The quaternary ammonium salts of Formula A can be prepared either by (1) a direct replacement reaction of a substituted alkane with a diazabicycloalkene of the following formula:

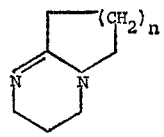

(B)

where $n$ is a positive integer of from 1 to 3, or (2) by the replacement reaction of an alkane substituted with an easily replaceable radical and a diazabicycloalkene of Formula B, followed by a second reaction in which the anion of the salt thus formed is itself replaced by a second anion. Suitable replaceable radicals are methanesulfonyloxy and p-toluenesulfonyloxy. These anions are easily replaced by such anions as chloride, bromide, and the like.

By method (1), preferred for obtaining the quaternary ammonium halide, an alkyl halide, such as alkyl bromide, chloride, or iodide, is directly reacted with diazabicycloalkene to yield the corresponding diazabicycloalkenonium halide.

The alkyl halide can be a primary or secondary halide. Higher percentage yields are obtained with the primary halide and therefore the primary halide is preferred. Particularly preferred, as they are most readily obtainable are the primary halides of the straight chain alkanes.

By method (2), a methanesulfonyloxy alkane or a p-toluenesulfonyloxy alkane is reacted with a diazabicycloalkene to yield the corresponding methanesulfonate or p-toluene sulfonate salt respectively. The anion of the salt is then replaced by conventional techniques. By way of example, to obtain the salt of other acceptable anions, the sulfonate salt can be subject to a strongly basic ion exchange resin, e.g. quaternary ammonium ion exchange resin, in the hydroxide cycle, to yield the corresponding diazabicycloalkenonium hydroxide. The thus obtained hydroxide is treated with one equivalent of the acid of the desired anion, such as HCl, HBr, acetic acid, and the like. Alternatively, the sulfonate salt can be treated with a quaternary ammonium ion exchange resin in chloride, bromide, sulfate form, etc. to give the corresponding chloride, bromide, and sulfate salt, etc.

As in the case of the alkyl halide, the methanesulfonyloxy and the p-toluenesulfonyloxy may be attached to a primary or secondary carbon, and, for similar reasons, the primary carbon substituted form is preferred, especially the primary carbon substituted form of the straight chain alkanes.

The $C_{10}$–$C_{24}$ halogenated alkanes used in preparing the halide salts of this invention can be obtained either commercially, or prepared by the halogenation of an alcohol of the desired chain length with such agents as hydrochloric acid, hydroiodic acid, phosphorus trichloride, phosphorus tribromide, thionylchloride, and the like. For a description of these preparations, (and others), see Wagner and Zook, Synthetic Organic Chemistry, John Wiley & Sons, Inc., pp. 88–147 (1953). The starting alcohols can be obtained commercially, prepared by the reduction of a fatty acid of the desired chain length, or prepared by other well known techniques, such as those disclosed by Nazarov et al., Zhur. Obshchei Khim., 30, 443–50 (1960), Miller et al, Ind. Eng. Chem., 53, 33–6 (1961), and Milburn et al, J. Chem. Soc., 1954, 3344–51.

The methanesulfonyloxy alkane is prepared by reducing a fatty acid of the desired chain length to the corresponding alcohol, and then subsequently reacting the thus obtained alcohol with methanesulfonylchloride in anhydrous pyridine at room temperature. Fieser and Fieser, Reagents for Organic Synthesis, John Wiley & Sons, Inc., page 662 (1967). The p-toluenesulfonyloxy alkane is prepared in a similar manner.

The diazabicycloalkenes of Formula (B) are commercially available, or if desired, can be synthesized using the procedures as set forth by Oediger et al, Chem. Ber., 99, 2012 (1966) or Oediger and Moller, Angew. Chem. Internat., Edit., 6, No. 1, 76 (1967).

In the preparation of the compounds of the present invention, the reaction between the substituted alkanes and the diazabicycloalkene can be carried out in the absence of solvent, or in an organic solvent inert to the reaction, such as benzene, toluene, petroleum ether, diglyme, hexane, pentane, xylene, tetrahydrofuran, methylethyl ketone, and the like, and mixtures thereof.

The reaction is carried out at from room temperatures to the reflux temperature of the reaction mixture, usually not higher than 150° C. Preferably, the reaction is carried out under anhydrous conditions and in the absence of air, e.g., by reacting under nitrogen, to minimize the formation of side products.

The particular reaction temperature selected will depend upon the particular substituted alkane to be reacted as well as the particular solvent. Reaction times will vary depending upon the nature of the reactants, the reaction temperature, and the particular solvent, usually ranging from several minutes to an hour or more. The optimum temperature and time of reaction can easily be determined by routine experimentation once the particular reactants and solvent have been selected. By way of example, the reaction of the diazabicycloalkene with alkyl iodide proceeds easily at room temperature. The alkyl bromides and alkyl chlorides normally are reacted under reflux in order to obtain optimum yields within reasonable lengths of time.

The molar ratio of sulfonyl or halo alkane to diazabicycloalkene is not critical but typically is in the range of about from .1 to 10 mols of sulfonyl or halo alkane to diazabicycloalkene. As the reaction is essentially stoichiometric, a molar ratio of about 1:1 is preferred. To ensure complete reaction, a molar excess of either one of the reactants may be added to the reaction mixture. Generally, a molar excess of the least expensive of the reactants should be added. However, unnecessary excesses should be avoided, as such results in a product mixture containing the quaternary ammonium salt and unreacted ingredients which typically are eventually separated.

The order of addition of reactants is immaterial. They may be added to the reaction zone in any order, either singly or premixed.

Once the reaction is complete, the product is recovered by conventional techniques. For example, the product mixture can be cooled, solvent and any remaining reactants removed by distillation in high vacuum and the resulting solid crystalline material directly recrystallized. Other recovery techniques include thin layer or partition chromatography.

The quarternary ammonium salts of the present invention are anti-bacterial, antiviral, antiparasitic, and antiseptic. They are effective against bacteria and fungi, such as *Bacillus subtilis, Staphylococcus aureus, Escherichia coli, Proteus vulgaris, Salmonella paratyphi, Pseudomonas aeruginosa, Shigella sonnei, Microsporum gypseum, Candida albicans, Trichophytom mentagrophytes, Streptococcus pyogenes, Diplococcus pneumonia, N. Asteroides, Cr. neoformans,* and *S. schenshii.* The novel compounds are effective in controlling bacteria and fungi within a wide dosage range. Depending upon such factors as the degree and severity of infection, type of bacteria or fungi, the quaternary ammonium salts of the present invention are biocidal or biostatic. They can be used in solutions, sprays, and the like for disinfecting inanimate objects or can be used topically in the form of ointments, creams, solutions, sprays, and the like for treating bacterial infections of animals.

A further understanding of the invention can be had from the following examples.

EXAMPLE 1

Into a 100 ml. flask is placed 8 g. of hexadecylbromide, 3.26 g. of 1,5-diazabicyclo[4.3.0]non-5-ene and 50 ml. of benzene. The reactants are heated under reflux and nitrogen for approximately 3 hours. The solution is then cooled under nitrogen and diluted with hexane until it becomes cloudy. The product appears as a fine, pearlescent precipitate upon further cooling to approximately −10° C. The suspension is then centrifuged for 10 minutes at 10,000 r.p.m. at approximately 8° C., the supernatant decanted, and the white precipitate re-suspended in cold hexane and recentrifuged. This procedure is repeated, the supernatant decanted, and the precipitate dried for 25 hours at room temperature and under high vacuum to yield 7.945 grams of white pearlescent product, 5-hexadecyl-1,5-diazabicyclo[4.3.0]nonenonium bromide. The decanted liquid fractions are combined and evaporated under reduced pressure. The resulting clear oil is dissolved in tetrahydrofuran and cooled to −10° C. to give a precipitate, which is filtered under nitrogen at 4° C., washed with hexane and vacuum dried at room temperature to yield 0.748 grams of solid product comprising 5-hexadecyl-1,5-diazabicyclo[4.3.0]nonenonium bromide.

EXAMPLE 2

Following the procedures as set forth in Example 1, hexadecyl bromide is reacted with 1,5-diazabicyclo[5.4.0]-undec-5-ene and 1,5-diazabicyclo[4.4.0]dec-5-ene to yield respectively 5 - hexadecyl-1,5-diazabicyclo[5.4.0]undecenonium bromide and 5-hexadecyl-1,5-diazabicyclo[4.4.0]-decenonium bromide. Tetracosyl bromide is reacted with a molar equivalent of 1,5-diazabicyclo[5.4.0]undec-5-ene to yield 5-tetracosyl-1,5-diazabicyclo[5.4.0]undecenonium bromide. Octadecyl bromide is reacted with 1,5-diazabicyclo[4.4.0]undec-5-ene and 1,5-diazabicyclo[4.3.0]non-5-ene to yield 5-octadecyl-1,5-diazabicyclo[4.4.0]undecenonium bromide and 5-octadecyl-1,5-diazabicyclo[4.3.0]-nonenonium bromide, respectively.

EXAMPLE 3

To 2.3 g. of decylchloride in a 50 ml. flask, is added 1.63 g. of 1,5-diazabicyclo[4.3.0]non-5-ene and 25 ml. of benzene. The mixture is refluxed under nitrogen for 12 hours. The resulting product is then evaporated under reduced pressure followed by the application of high vacuum at 40° C.

The solid product is slurried with 100 ml. of hexane and filtered. This procedure is repeated and the thus obtained solid is dried under reduced pressure. The resulting white powder consists of 5-decyl-1,5-diazabicyclo-[4.3.0]nonenonium chloride.

EXAMPLE 4

Into a 50 ml. flask is added 1.63 g. of diazabicyclo-decene, 4.71 g. of decyl iodide and 25 ml. of hexane. The reaction is allowed to proceed under nitrogen atmosphere and at room temperature for about a half hour. The reaction mixture is then subject to evaporation under reduced pressure. The remaining solid product is suspended in toluene, filtered, and washed several times with additional toluene. The washed solid product is then dried in high vacuum. The resulting white powder comprises 5-decyl-1,5-diazabicyclo[4.4.0]decenonium iodide.

In a similar manner, tetracosyl iodide is reacted with 1,5-diazabicyclo[4.3.0]non-5-ene to obtain 5-tetracosyl-1,5-diazabicyclo[4.3.0]nonenonium iodide.

EXAMPLE 5

Following the procedure set forth in Example 1, 14-methylpentadecyl chloride, 3,3-dimethyldecyl chloride, 5,9-dimethyldecyl chloride, 4,10-dimethyldodecyl bromide, 3,7,11-trimethyldodecyl bromide, 10-methylundecyl iodide, 12-methyltridecyl bromide, 20-methyltricosyl bromide, 18-methyleicosyl chloride, 6-pentylundecyl iodide, hexadecyl chloride, decyl chloride and dodecyl iodide are separately reacted with 1,5-diazabicyclo[4.4.0]dec-5-ene to yield respectively, 5-(14'-methylpentadecyl)-1,5-diazibicyclo[4.4.0]decenonium chloride,
5-(3',3'-dimethyldecyl)-1,5-diazabicyclo[4.4.0]decenonium chloride,
5-(5',9'-dimethyldecyl)-1,5-diazabicyclo[4.4.0]deceneonium chloride,
5-(4',10'-dimethyldodecyl)-1,5-diazabicyclo[4.4.0] decenonium bromide,
5-(3',7',11'-trimethyldodecyl)-1,5-diazabicyclo[4.4.0] decenonium bromide,
5-(10'-methylundecyl)-1,5-diazabicyclo[4.4.0]decenonium iodide,
5-(12'-methyltridecyl)-1,5-diazabicyclo[4.4.0]decenonium bromide,
5-(20'-methyltricosyl)-1,5-diazabicyclo[4.4.0]decenonium bromide,
5-(18'-methyleicosyl)-1,5-diazabicyclo[4.4.0]decenonium chloride,
5-(6'-pentylundecyl)-1,5-diazabicyclo[4.4.0]deceneonium iodide,
5-hexadecyl-1,5-diazabicyclo[4.4.0]decenonium chloride,
5-dodecyl-1,5-diazabicyclo[4.4.0]decenonium iodide.

EXAMPLE 6

By the methods as outlined above, 10 g. of methanesulfonyloxy decane is reacted with 6 g. of 1,5-diazabicyclo [4.4.0]dec-5-ene. The residue, 5-decyl-1,5-diazabicyclo [4.4.0]decenonium methanesulfonate, is dissolved in methanol and filtered slowly through a column of a quaternary ammonium ion exchange resin sold under the trademark Dowex 2-X8 (30 grams of resin, chloride form). The resulting eluate is vaporated under vacuum to yield the chloride salt, 5-decyl-1,5-diazabicyclo[4.4.0] decenonium chloride. The filtration procedure is repeated for fresh methanesulfonate, the column containing 30 g. of ion exchange resin (sulfate form) sold under the trademark Dowex 2-X8 5-decyl-1,5-diazabicyclo[4.4.0] decenonium sulfate.

In a similar manner, 1 g. of p-toluenesulfonyloxy decane is reacted with 4 g. of 1,5-diazabicyclo[4.3.0]non-5-ene to yield 5-decyl-1,5-diazabicyclo[4.3.0]nonenonium p-toluenesulfonate. The p-toluenesulfonate salt is filtered through a column of ion exchange resin (chloride form) sold under the trademark Dowex 2-X8, ad the dried to yield 5-decyl-1,5-diazabiocyclo[4.3.0]nonenonium chloride.

EXAMPLE 7

Following the procedures of Example 1, substituting hexadecyl chloride for hexadecyl bromide, a white solid product, 5 - hexadecyl-5-diazabicyclo[4.3.0]nonenonium chloride is obtained. This product is dissolved in methanol and filtered through a column of 20 g. of ion exchange resin (OH form) sold under the trademark Dowex 2-X8. The resulting diazabicyclo[4.3.0]nonenonium hydroxide eluate is treated with one equivalent of aqueous hydrobromic acid and the solvents evaporated to yield the corresponding diazabicyclo[4.3.0]nonenonium bromide.

Addition of one equivolent of acetic, propionic, lactic, benzoic and nicotinic acids to separate portions of diazabicyclo[4.3.0]nonenonium hydroxide yields respectively the acetate, propionate, lactate, benzoate and nicotinate salts thereof.

Obviously many modifications and variations of the invention described hereinabove and in the appended claims can be made without departing from the essence and scope thereof.

Having thus described the invention, what we claim is:
1. A quaternary ammonium salt of the formula:

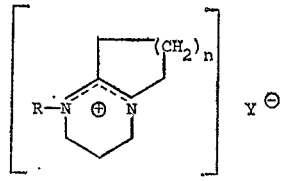

wherein R is a straight chain alkyl of 10 to 24 carbon atoms or a branched alkyl of 10 to 24 carbon atoms in the longest chain and having one or more branched groups selected from the group consisting of alkyls having from one to eight carbon atoms; $n$ is a positive integer of from one to three; and Y is a non-toxic anion.

2. The salt of claim 1 wherein R is a straight chain $C_{10}$–$C_{24}$ alkyl.

3. The salt of claim 2 wherein Y is selected from the group consisting of chloride, bromide, methanesulfonyloxy, and p-toluenesulfonyloxy.

4. The 5-decyl-1,5-diozabicyclo[4.3.0]nonenonium chloride of claim 1.

5. The 5-decyl-1,5-diazabicyclo[4.4.0]decenonium chloride of claim 1.

6. The 5-decyl-1,5-diazabicyclo[5.4.0]undecenonium chloride of claim 1.

7. The 5-dodecyl-1,5-diazabicyclo[4.3.0]nonenonium chloride of claim 1.

8. The 5-dodecyl-1,5-diazabicyclo[4.4.0]decenonium chloride of claim 1.

9. The 5-tetradecyl-1,5-diazabicyclo[4.3.0]nonenonium chloride of claim 1.

10. The 5-tetradecyl-1,5-diazabicyclo[4.4.0]decenonium chloride of claim 1.

11. The 5-tetradecyl-1,5-diazabicyclo[5.4.0]undecenonium chloride of claim 1.

12. The 5-hexadecyl-1,5-diazabicyclo[4.3.0]nonenonium chloride of claim 1.

13. The 5-hexadecyl-1,5-diazabicyclo[4.4.0]decenonium chloride of claim 1.

14. The 5-hexadecyl-1,5-diazabicyclo[5.4.0]undecenonium chloride of claim 1.

15. The 5-octadecyl-1,5-diazabicyclo[4.3.0]nonenonium chloride of claim 1.

16. The 5-octadecyl-1,5-diazabicyclo[4.4.0]decononium chloride of claim 1.

17. The 5-octadecyl-1,5-diazabicyclo[5.4.0]undecononium chloride of claim 1.

References Cited
FOREIGN PATENTS 1,491,791    7/1967    France.

OTHER REFERENCES

Kirk-Othmer: "Encyclopedia of Chemical Technology," vol. 11, pp. 380–381 (1953), Interscience Publishers.

ALEX MAZEL, Primary Examiner

R. V. RUSH, Assistant Examiner

U.S. Cl. X.R.

260—999